(12) United States Patent
Ducreux et al.

(10) Patent No.: US 10,494,102 B2
(45) Date of Patent: Dec. 3, 2019

(54) SEAT MODULE COMPRISING A TRAY TABLE WITH AN OPTIMISED DESIGN

(71) Applicant: Safran Seats, Plaisir (FR)

(72) Inventors: Christophe Ducreux, Issoudun (FR); Charles Ehrmann, Le Bréviaires (FR); Benjamin Foucher, Tours (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 15/566,497

(22) PCT Filed: Apr. 5, 2016

(86) PCT No.: PCT/EP2016/057416
§ 371 (c)(1),
(2) Date: Oct. 13, 2017

(87) PCT Pub. No.: WO2016/165978
PCT Pub. Date: Oct. 20, 2016

(65) Prior Publication Data
US 2018/0127099 A1    May 10, 2018

Related U.S. Application Data

(60) Provisional application No. 62/146,662, filed on Apr. 13, 2015.

(51) Int. Cl.
*B64D 11/06* (2006.01)
*B60N 3/00* (2006.01)

(52) U.S. Cl.
CPC ......... *B64D 11/0644* (2014.12); *B60N 3/002* (2013.01); *B64D 11/064* (2014.12); *B64D 11/0604* (2014.12); *B64D 11/0605* (2014.12); *B64D 11/0606* (2014.12); *B64D 11/0627* (2014.12); *B64D 11/0638* (2014.12)

(58) Field of Classification Search
None
See application file for complete search history.

(56) References Cited

U.S. PATENT DOCUMENTS

| 6,170,786 B1 * | 1/2001 | Park ..................... B60N 2/0232 248/274.1 |
| 7,178,871 B1 * | 2/2007 | Round ................... B60N 2/242 297/244 |

(Continued)

FOREIGN PATENT DOCUMENTS

| WO | 2000021831 | 4/2000 |
| WO | 2008031506 | 3/2008 |
| WO | 2011089558 | 7/2011 |

OTHER PUBLICATIONS

International Patent Application No. PCT/EP2016/057416, Search Report (including translation) and Written Opinion (including translation), dated Jun. 8, 2016.

*Primary Examiner* — David E Allred
(74) *Attorney, Agent, or Firm* — Kilpatrick Townsend & Stockton LLP; Dean W. Russell; Tiffany L. Williams (57) ABSTRACT

The invention relates mainly to a seat module intended to be installed in an aircraft cabin, having a seat and a tray table that is movable between a folded position and a deployed position, wherein the tray table is also movable in translation and/or in rotation with respect to the seat in order to be moved from the deployed position to an offset deployed position.

10 Claims, 5 Drawing Sheets

(56) References Cited

U.S. PATENT DOCUMENTS

| | | | |
|---|---|---|---|
| 7,506,923 B1* | 3/2009 | Gauss | B60N 3/002 297/149 |
| 2001/0000639 A1* | 5/2001 | Park | A47C 1/0352 297/411.3 |
| 2011/0156450 A1* | 6/2011 | Collins | B60N 3/002 297/135 |
| 2012/0292957 A1* | 11/2012 | Vergnaud | B64D 11/06 297/188.08 |
| 2012/0305705 A1* | 12/2012 | Vergnaud | B60N 2/01 244/118.6 |
| 2013/0248655 A1 | 9/2013 | Kroll et al. | |
| 2015/0259072 A1* | 9/2015 | Gagnon | B64D 11/0007 244/118.5 |
| 2016/0288911 A1* | 10/2016 | Helwig | B64D 11/0638 |
| 2016/0376008 A1* | 12/2016 | Kuyper | A47B 5/006 244/122 R |
| 2017/0021932 A1* | 1/2017 | Marais | B64D 11/0638 |
| 2017/0029114 A1* | 2/2017 | Herault | B64D 11/06 |
| 2017/0233057 A1* | 8/2017 | Charles | B64D 11/0601 244/122 R |
| 2017/0233078 A1* | 8/2017 | Newell | B64D 11/0638 297/170 |
| 2017/0259923 A1* | 9/2017 | Morgan | B64D 11/0644 |

\* cited by examiner

SEAT MODULE COMPRISING A TRAY TABLE WITH AN OPTIMISED DESIGN

CROSS REFERENCE TO RELATED APPLICATIONS

This patent application is the U.S. national stage entry of PCT/EP2016/057416, filed Apr. 5, 2016, which application claims the benefit of U.S. Provisional Application No. 62/146,662, filed Apr. 13, 2015 and entitled FIXTURES FOR ANGLED BUSINESS CLASS SEATS (TRAY TABLE AND ARMREST WITH STOWAGE SPACE), both of which are incorporated in their entireties by this reference.

The present invention relates to a seat module comprising a tray table with an optimized design.

Seat modules that are intended to be installed in an aircraft cabin and have a seat that is able to take up at least one sitting position and an extended position, a shell positioned around the seat, and a tray table situated in the rear face of the shell are known. The tray table is designed to be moved between a folded position and a functional deployed position allowing the passenger to place objects on the tray table.

The invention aims to improve the comfort of the passenger by proposing a seat module intended to be installed in an aircraft cabin, having at least one seat and at least one tray table that is movable between a folded position and a deployed position, characterized in that the tray table is also movable in translation and/or in rotation with respect to the seat in order to be moved from the deployed position to an offset deployed position.

The invention thus makes it possible to have a tray table that can take up a deployed position and an offset position allowing the passenger to move the tray table supporting objects out of the way in order to free up the space in front of him, this making it easier to access the aisle of the cabin.

According to one embodiment, an axis normal to a rear face of the tray table, when the tray table is in the folded position, is inclined with respect to an axis of extension of said seat.

According to one embodiment, the seat has an axis of extension and the tray table has at least one lateral edge of the tray table that is inclined with respect to the axis of extension of the seat when the tray table is in the deployed position and/or substantially parallel to the axis of extension of the seat when the tray table is in the offset deployed position.

According to one embodiment, the tray table is also movable in translation in a direction parallel to the axis of extension of the seat about the offset deployed position. The passenger can thus adjust the distance of the tray table with respect to his body shape so as to be positioned comfortably for a work session or to enjoy his meal.

According to one embodiment, the tray table has a support that is mounted so as to be movable in rotation with respect to the shell, notably via a hinge.

According to one embodiment, the tray table has a plate that is movable in translation and/or in rotation with respect to the support.

According to one embodiment, said seat module also has a shell partially surrounding the seat.

According to one embodiment, a portion of the shell and a rear face of the seat delimits an internal volume that is accessible through an opening made in said shell and in particular closed off by the tray table when the tray table is in the folded position. This makes it possible to optimize the volume of the seat by making it possible to house objects inside this internal space.

According to one embodiment, a stowing device is positioned inside the internal volume.

According to one embodiment, the seat module has two seats, and a retractable wall positioned between the two seats.

This makes it possible to have a collaborative working zone when the wall is in the stowed position and the tray tables of the two adjacent seats are in the offset deployed position.

According to one embodiment, the axes of extension of the seats are inclined with respect to one another and intersect at a point, notably situated behind the seats. This inverted-V design, compared with a design in which the point of the V is situated at the level of the footrest of the passengers, makes it possible for the passengers to move towards one another in order to make it easier for them to interact during a work session.

Of course, the various characteristics, variants and/or embodiments of the present invention can be associated with one another in different combinations inasmuch as they are not incompatible or exclusive with respect to one another.

The present invention will be understood better and further features and advantages will become more apparent from reading the following detailed description comprising embodiments given by way of illustration with reference to the appended figures, which are presented by way of non-limiting examples and may serve to further the understanding of the present invention and explain how it is embodied and, where appropriate, help to define it, and in which.

It should be noted that, in the figures, the structural and/or functional elements that are common to the different embodiments can have the same references. Thus, unless stated otherwise, such elements have identical structural, dimensional and material properties.

Figure 2A:
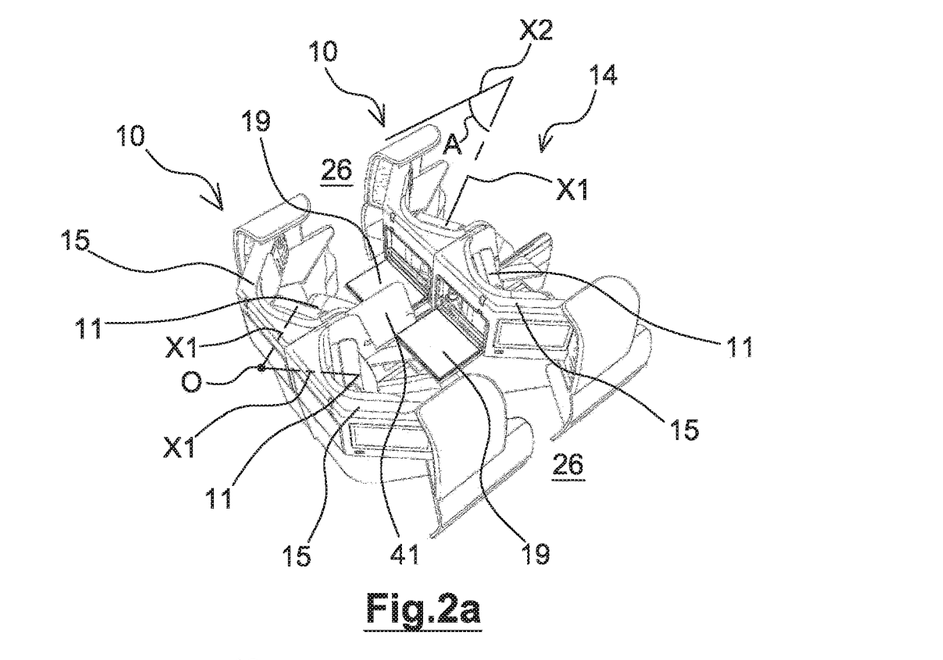
FIGS. 2a and 2b are perspective views illustrating the integration of a retractable wall that allows the creation of a collaborative working zone for two-seat modules according to the invention.
Figure 2B:
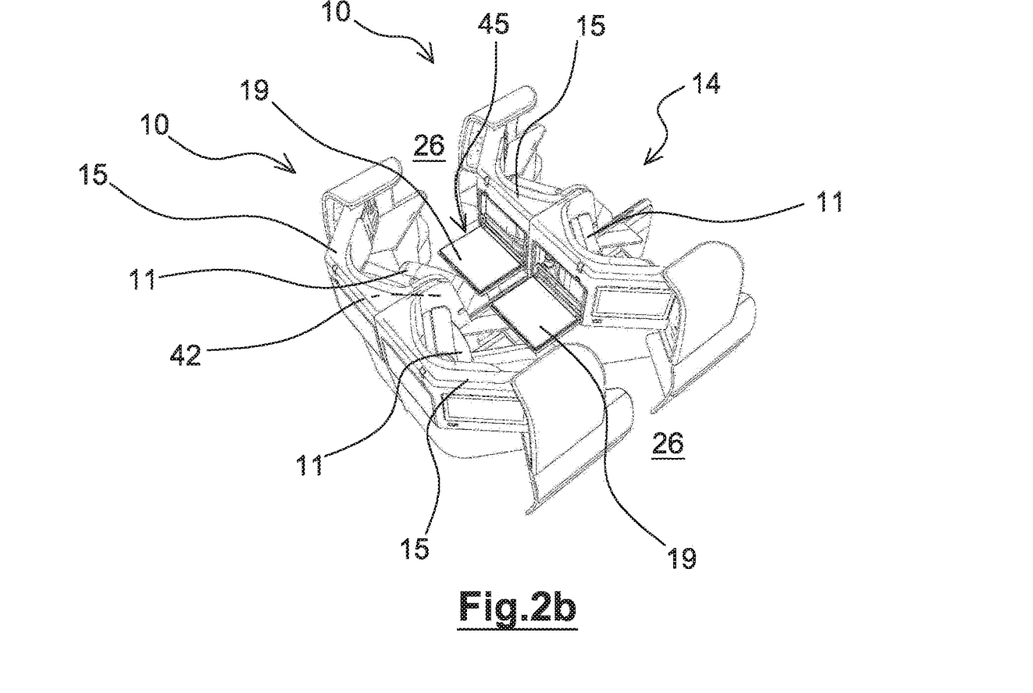

As is illustrated in FIGS. 2a and 2b, a layout of an aircraft cabin 14 has a row of at least two seat modules 10 positioned one behind the other. Inside the row, the seat modules 10 can be oriented such that the seats face toward the front and/or the rear of the aircraft.

However, it should be noted that, in the rest of the description, the terms "front" and "rear" locally define the relative position of the seats inside the row and do not refer to any orientation of the seats inside the cabin of the aircraft. In other words, the expression "front seat module" means that the seat module is positioned directly in front of another seat module inside the row, while the expression "rear seat module" means that the seat module is positioned directly behind another seat module inside the row.

As is clearly visible in FIGS. 1a to 1d, a seat module 10 has at least one seat 11, advantageously provided with kinematics that allow it to be movable between a raised position, in which the seat 11 is designed to define a seated position of a passenger, and an inclined position, in which the seat 11 is designed to define a lying surface for the passenger, which is advantageously substantially horizontal.

The seat 11 has an axis of extension X1 defined by the intersection between a horizontal plane and a vertical median plane of the seat 11. Advantageously, the vertical median plane of the seat 11 is also a plane of symmetry of the seat 11.

According to one exemplary embodiment presented in the figures, the axis of extension X1 of the seat 11 is inclined with respect to a longitudinal axis X2 of the aircraft. In such an arrangement, the axis of extension X1 of the seat 11 and the longitudinal axis X2 of the aircraft form an angle A between one another, which is visible in FIG. 2a.

In addition, the seat module 10 has at least one shell 15 that makes it possible, notably, to ensure the privacy of the passenger sitting on the seat 11. According to one particular alternative embodiment, the shell 15 at least partially surrounds the seat 11. Furthermore, the shell 15 may also at least partially surround an armrest 18 of the seat 11.

Figure 1A:
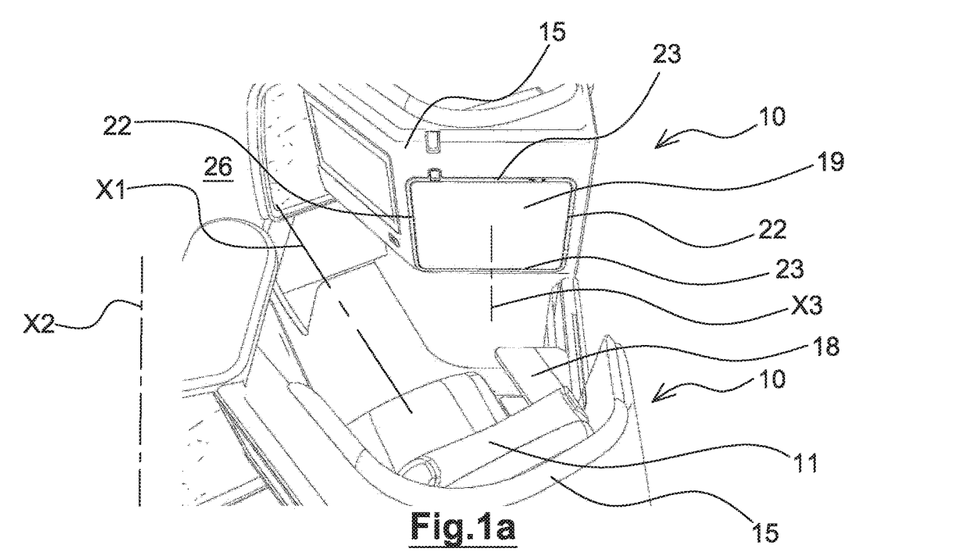
FIGS. 1a to 1d are perspective views illustrating different positions of a tray table of a seat module according to the present invention.
Figure 1B:
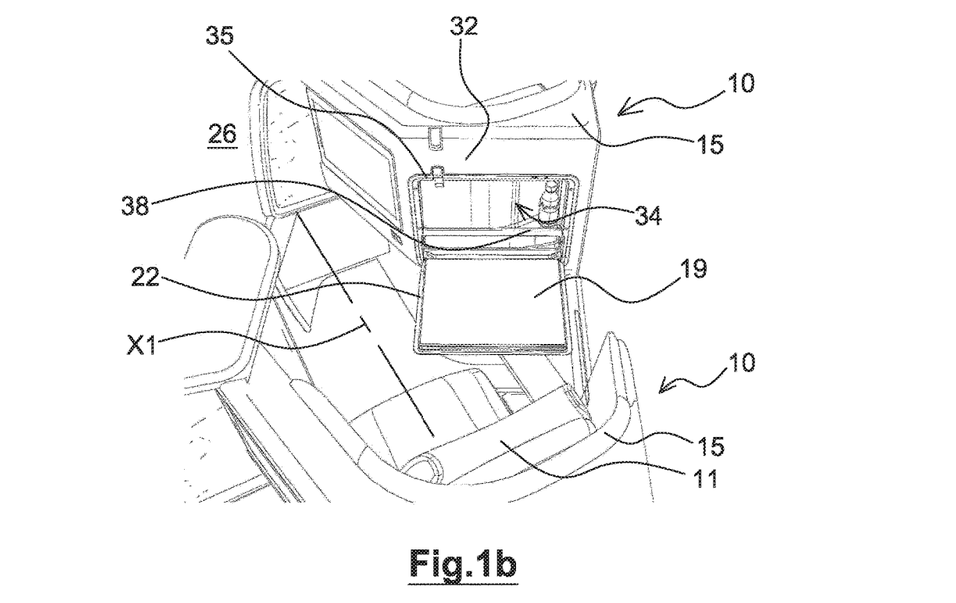

In addition, the seat module 10 also has at least one tray table 19, in particular positioned on a rear face of the shell 15. The tray table 19 is movable between a folded position, as shown in FIG. 1a, and a deployed position, as shown in FIG. 1b. Preferably, the tray table 19 may have an offset deployed position.

When the tray table 19 is in the folded position, an axis X3 normal to a rear face of the tray table 19 is inclined with respect to the axis of extension X1 of the corresponding seat 11. The term "inclined" means that the normal axis X3 and the axis of extension X1 form a nonzero angle with respect to one another.

As can be seen in FIG. 1b, a lateral edge 22 of the tray table 19 is inclined with respect to the axis of extension X1 of the corresponding seat 11 when the tray table 19 is in the offset deployed position. The term "inclined" means that the lateral edge 22 and the axis of extension X1 form a nonzero angle with respect to one another.

It should be noted that the lateral edge 22 in question in the present description corresponds to one of the edges of the tray table 19 that has a substantially vertical orientation when the tray table 19 is in the folded position.

Furthermore, the tray table 19 may also have at least one transverse edge 23 having a substantially horizontal orientation, as shown in FIG. 1a.

Thus, in the deployed position, the vertical median plane of the rear seat 11 does not intersect the tray table 19 of the front seat 11, which is thus offset with respect to the passenger. This allows the passenger to more easily access a main aisle 26 of the aircraft, visible in FIGS. 2a and 2b.

Figure 1C:
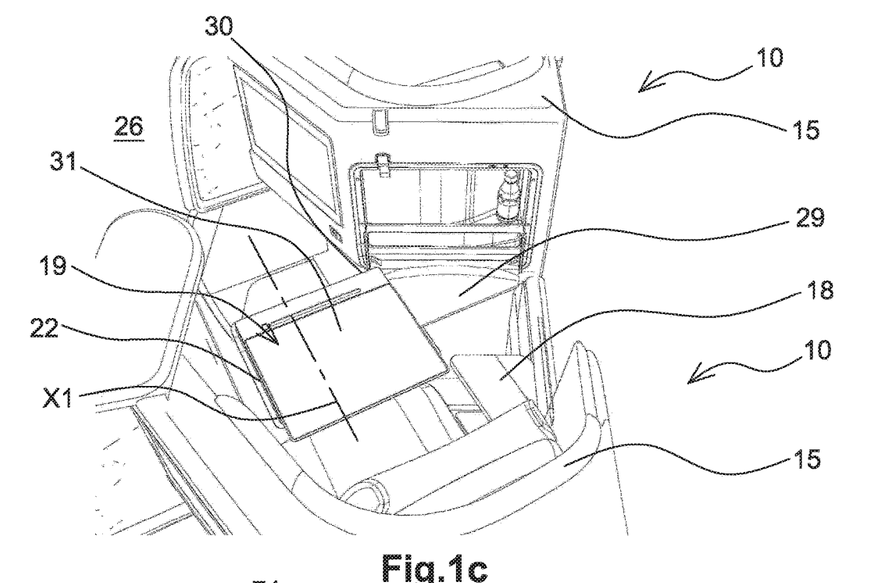

The tray table 19 is also movable in translation and/or in rotation with respect to the seat 11 in order to be moved from the deployed position to an offset deployed position, as presented in FIG. 1c.

When the tray table 19 is in the offset deployed position, the axis of extension X1 of the seat 11 is substantially parallel to the lateral edge 22 of the tray table 19 and/or substantially perpendicular to the transverse edge 23 of the tray table 19.

In the offset deployed position, the vertical median plane of the rear seat 11 intersects the tray table 19 of the front seat 11. The tray table 19 is thus situated facing the passenger who is then positioned comfortably in order to enjoy his meal or to work.

Preferably, the tray table 19 is also movable in translation in a direction of movement D1 advantageously parallel to the axis of extension X1 of the seat 11, about the offset deployed position. It is thus possible to adjust a distance of the tray table 19 away from the passenger.

In order to ensure the movements from one position to the other, the tray table 19 has a support 29, visible in FIG. 1c. The support 29 is preferably mounted so as to be movable in rotation with respect to the shell 15, notably via a hinge 30 installed on the shell 15, in order to allow it to be moved from the folded position to the deployed position.

The tray table 19 also has a plate 31, which is advantageously movable, notably in translation and/or in rotation with respect to the support 29, in order to allow the tray table 19 to be moved from the deployed position to the offset deployed position and vice versa.

Furthermore, as can be seen in FIG. 1b, a portion 32 of the shell 15 and the rear face of the seat 11 delimits an internal volume 34 that is accessible through an opening 35 made in the shell 15. The opening 35 is advantageously closed off, entirely or partially, by the tray table 19 when the tray table 19 is in the folded position.

Additionally, a stowing device 38 is positioned inside the internal volume 34. Such a stowing device 38 may, for example, be in the form of a bottle holder or document holder.

In the exemplary embodiment in FIGS. 2a and 2b, the seat module 10 has two seats 11 and two shells 15 that are respectively positioned around a corresponding seat 11. In particular, the axes of extension X1 of the two seats 11 of one and the same seat module 10 are inclined with respect to one another and intersect at an intersection point O. According to one advantageous variant embodiment, the intersection point O is situated behind the seats 11. Thus, each seat 11 of the seat module 10 faces towards the main aisle 26. The seats 11 of the seat module 10 are oriented in different directions.

Additionally, a wall 41 is positioned between the two seats 11. Advantageously, the wall 41 is retractable and can be moved between a deployed position, as presented in FIG. 2a, and a retracted position, as presented in FIG. 2b. In the retracted position, the wall 41 may be positioned inside a housing 42, preferably situated at a junction between the shells 15 of the seats 11 of the seat module 10.

The placing of the wall 41 in the retracted position makes it possible to create a collaborative working zone 45 when the tray tables 19 of the two seats 11 of the module 10 are in the deployed position so as to be positioned alongside one another. Preferably, the distance between the two lateral edges 22 of the tray tables 19 facing one another is less than 50 cm, preferably less than 30 cm.

Figure 1D:
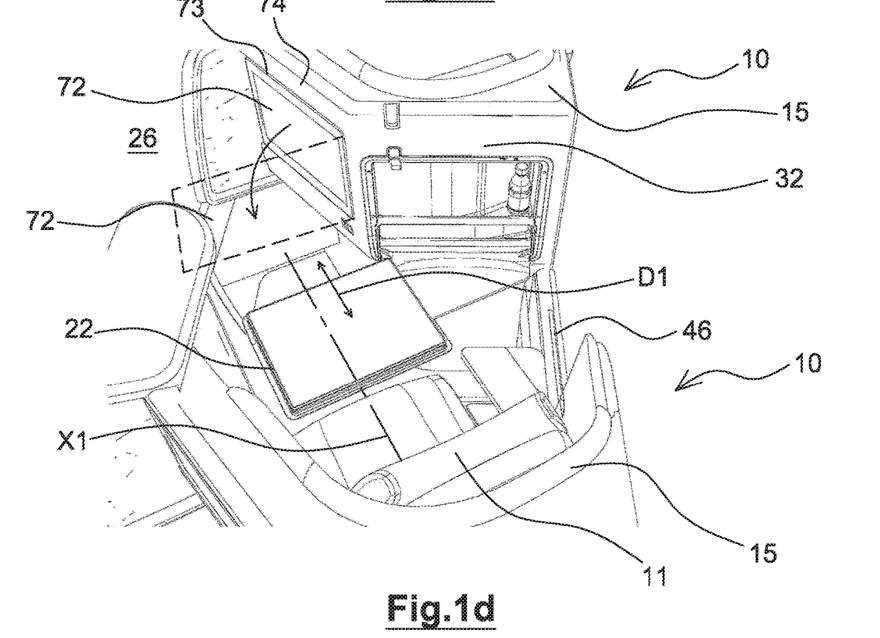

The transfer of the retractable wall 41 from a retracted position to a deployed position may be obtained by sliding the wall 41 along a slideway 46 made in one of the shells 15 of the seat 11, notably visible in FIG. 1d.

The seat module 10 having two seats 11 may be produced in a single block having two seats 11 and a shell 15 at least partially surrounding the two seats 11 or be formed from two half-blocks that are joined together and each have a seat 11 and an associated shell 15.

In certain embodiments, such as those illustrated in FIGS. 3a, 3b, 4a, 4b, the seat module 10 has a cushion 47 situated next to the seat 11. The cushion 47 is, preferably, a cushion for maximizing the lying area that is intended to be positioned in the same plane as the surface of the seat 11 when the latter is in the extended position. Alternatively, however, the cushion 47 may be positioned at a different level. Advantageously, the cushion 47 is offset laterally with respect to the seat 11.

Figure 3A:
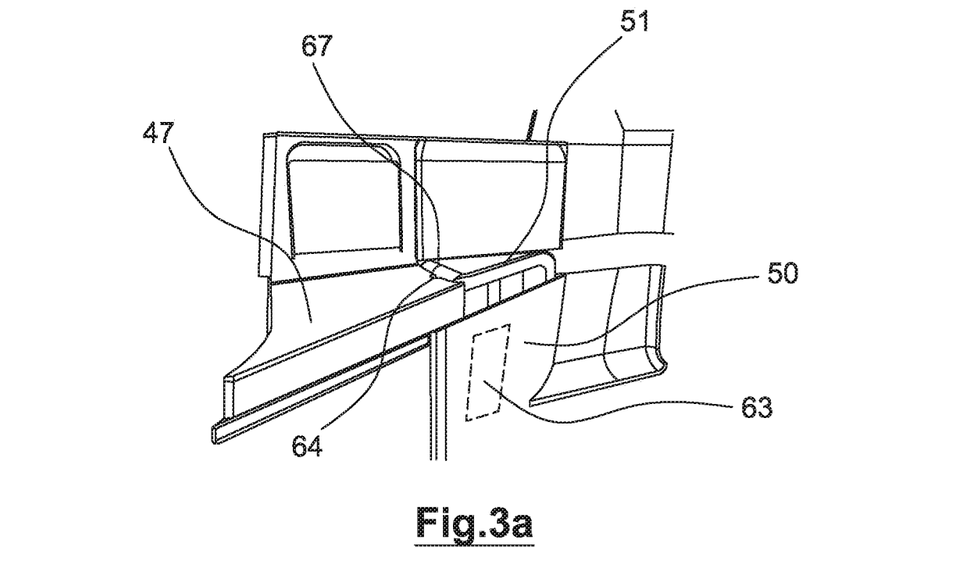
FIGS. 3a and 3b are perspective views illustrating an armrest, in a lowered position and in a raised position, respectively, according to the present invention.
Figure 3B:
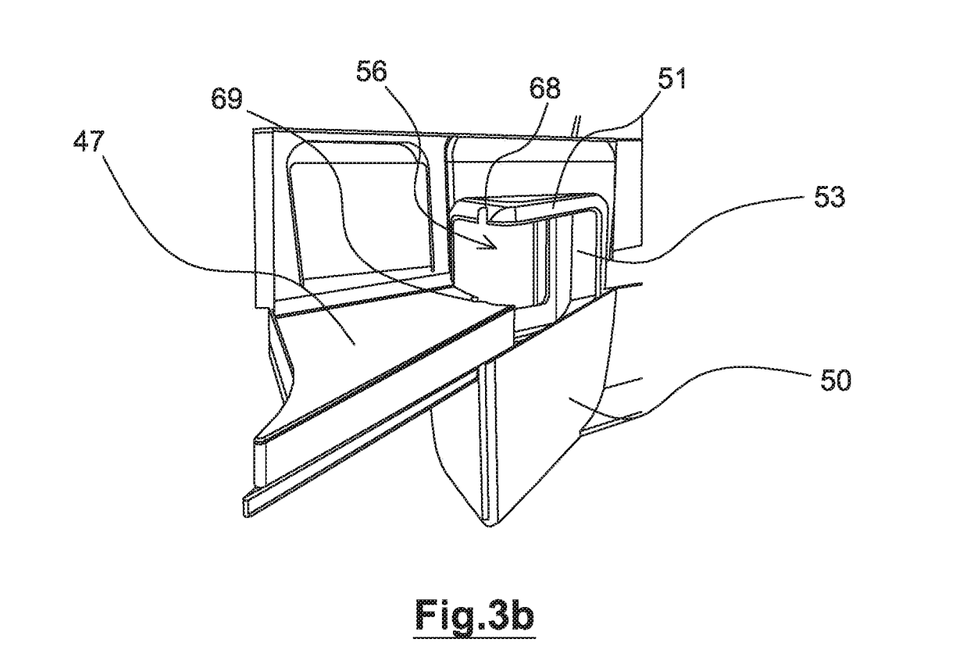

Furthermore, according to one variant embodiment, the armrest 18 is movable between a lowered position, as shown in FIG. 3a, and a raised position, as shown in FIG. 3b. The transfer of the armrest 18 from the lowered position to the raised position can notably be realized with the aid of a slideway mechanism, preferably installed in a casing 50 that receives the armrest 18 when the latter is in the lowered position.

Figure 4A:
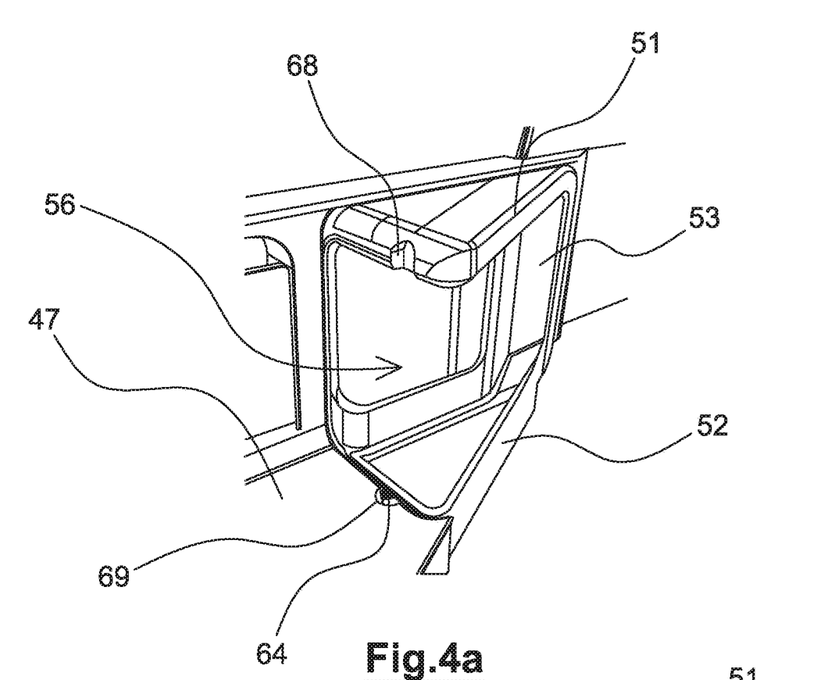
FIGS. 4a and 4b are detailed perspective views illustrating a removable cover of an upper wall of an armrest, in a closed position and in an open position, respectively, according to the invention.

As is visible in FIG. 4a, the armrest 18 can have an upper wall 51 on which the passenger can lean by placing his elbow thereon when the armrest 18 is in the raised position, and can have a lower wall 52. The upper wall 51 and the lower wall 52 are joined together by a connecting wall 53. Advantageously, the connecting wall 53 is offset toward an outer surface of the armrest 18. Arranged in this way, the lower wall 52 is situated on the opposite side from the upper wall 51. The armrest 18 thus has an open shape on the side of the seat 11.

Such an arrangement makes it possible to define an internal volume of the armrest. It is thus possible to incorporate a stowing device 56, such as a document holder, into the internal volume.

As illustrated in FIG. 3a, according to a preferred exemplary embodiment, the upper wall 51 of the armrest 18 is situated in continuation of the cushion 47 when the armrest 18 is in the lowered position. Moreover, as illustrated in FIG. 4a, the lower wall 52 of the armrest 18 is situated in continuation of the cushion 47 when the armrest 18 is in the raised position and the upper wall 51 protrudes with respect to the cushion 47. Such a configuration makes it possible to maximize the lying area regardless of the position of the armrest 18 with respect to the cushion 47.

Figure 4B:
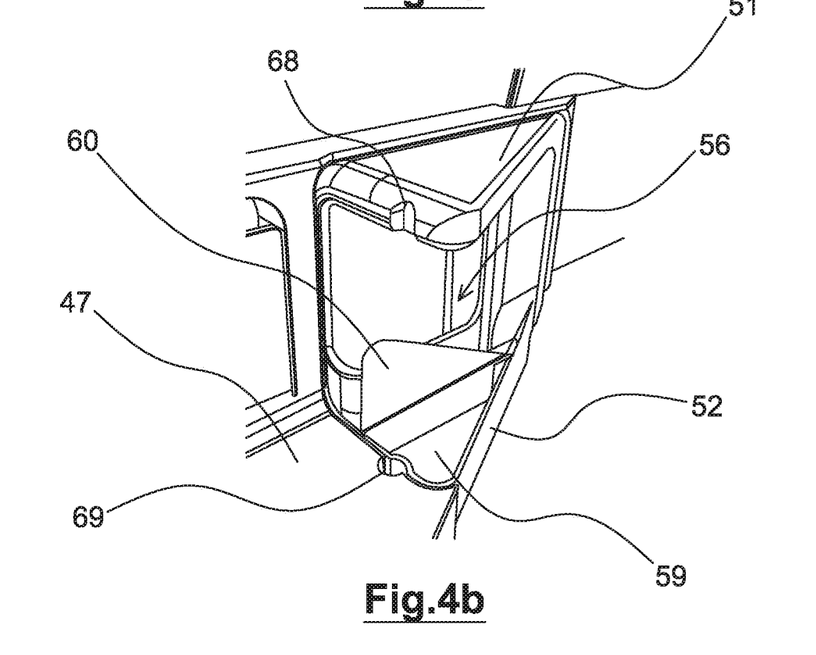

Preferably, the lower wall 52 of the armrest 18 has an opening 59, which is closed for example by a cover 60, notably a removable cover, as presented in FIG. 4b. The opening 59 provides access to a storage volume disposed under the lower wall 52, and in particular arranged in the casing 50 that receives the armrest 18. This makes it possible for the passenger to stow small objects inside the storage volume 59, for example a pair of glasses.

According to one variant embodiment, an energy storage device 63 is arranged in the casing 50 or in the armrest 18. The energy storage device 63 is shown schematically in FIG. 3a. The energy storage device 63 is able to store mechanical energy during a movement of the armrest 18 from the raised position to the lowered position and to release this mechanical energy in order to make it easier to move it from the lowered position to the raised position. The energy storage device 63 may, for example, be in the form of a gas cylinder or spring-loaded cylinder.

Additionally, a control means 64 that is able to allow the release of the stored energy by the energy storage device 63, such as a button, is situated next to the armrest 18. Preferably, the control means 64 is disposed inside a housing 67 that is accessible to the passenger. According to one particular embodiment, the housing 67 is delimited by two indentations 68, 69 made in the upper wall 51 of the armrest 18 and in the cushion 47, respectively.

It will be appreciated that such an armrest 18 may be installed on the above-described seat module 10 but also on any other type of seat module 10 or any type of seat 11 which has a cushion 47 and the ergonomics of which are intended to be improved.

Moreover, a display device 72 of a multimedia system, such as a screen, is mounted so as to be movable with respect to the shell 15 between a stowed position, in which the display device 72 is positioned inside a housing 73 made in a portion 74 of the shell 15, and a deployed position, in which the display device 72 is situated facing the passenger, notably in a position in which the axis of extension X1 of the seat 11 is perpendicular to the display device 72, as shown in FIG. 1d.

The portion 32 of the shell 15 delimiting the internal volume 34, which is able to define the stowing device 38, and the portion 74 of the shell 15 delimiting the housing 73, which is able to receive the display device 72, are inclined with respect to one another.

Of course, the invention is not limited to the above-described embodiments that are provided only by way of example. It encompasses various modifications, alternative forms and other variants which a person skilled in the art may envision within the scope of the present invention and notably any combinations of the various above-described embodiments, which can be considered separately or in combination.

The invention claimed is:

1. A seat module intended to be installed in an aircraft cabin the seat module comprising at least one seat and at least one tray table that is movable between a folded position and a deployed position,
   wherein the at least one tray table is also movable in at least one of translation and rotation with respect to the at least one seat in order to be moved from the deployed position to an offset deployed position;
   wherein the at least one seat has an axis of extension in a fore and aft direction of the seat, corresponding to a regular sitting orientation of a seat occupant, and the at least one tray table has at least one lateral edge,
   wherein the at least one lateral edge is
      substantially vertical when the at least one tray table is in the folded position,
      inclined with respect to the axis of extension when the at least one tray table is in the deployed position, and
      substantially parallel to the axis of extension when the at least one tray table is in the offset deployed position.

2. The seat module as claimed in claim 1, wherein an axis normal to a rear face of the at least one tray table, when the at least one tray table is in the folded position, is inclined with respect to an axis of extension of the at least one seat.

3. The seat module as claimed in claim 1, wherein the at least one tray table is also movable in translation in a direction parallel to the axis of extension of the at least one seat about the offset deployed position.

4. The seat module as claimed in claim 1, further comprising a shell at least partially surrounding the at least one seat, wherein the at least one tray table has a support that is mounted so as to be movable in rotation with respect to the shell via a hinge.

5. The seat module as claimed in claim 4, wherein the at least one tray table has a plate that is movable in at least one of translation and rotation with respect to the support.

6. The seat module as claimed in claim 1, further comprising a shell at least partially surrounding the at least one seat.

7. The seat module as claimed in claim 6, wherein a portion of the shell and a rear face of the at least one seat delimits an internal volume,
   wherein the internal volume is accessible through an opening in the shell, and wherein the opening in the shell is closed off by the at least one tray table when the at least one tray table is in the folded position.

8. The seat module as claimed in claim 7, wherein a stowing device is positioned inside the internal volume.

9. The seat module as claimed in claim 1, further comprising
two seats, and
a retractable wall positioned between the two seats.

10. The seat module as claimed in claim 9, wherein the axes of extension of the two seats are inclined with respect to one another and intersect at a point situated behind the two seats.

* * * * *